United States Patent
Schroeder et al.

(10) Patent No.: US 9,303,742 B2
(45) Date of Patent: Apr. 5, 2016

(54) INVERTED SPLINE RAIL SYSTEM

(75) Inventors: Robert Schroeder, Machesney Park, IL (US); Jonathan R. Schroeder, Machesney Park, IL (US)

(73) Assignee: Pacific Bearing Company, Rockford, IL (US)

( * ) Notice: Subject to any disclaimer, the term of this patent is extended or adjusted under 35 U.S.C. 154(b) by 1103 days.

(21) Appl. No.: 13/305,193

(22) Filed: Nov. 28, 2011

(65) Prior Publication Data

US 2013/0133448 A1    May 30, 2013

(51) Int. Cl.
*F16H 3/06* (2006.01)
*F16H 25/20* (2006.01)

(52) U.S. Cl.
CPC ...... *F16H 25/2006* (2013.01); *F16H 2025/204* (2013.01); *F16H 2025/2081* (2013.01); *Y10T 74/18648* (2015.01); *Y10T 74/18728* (2015.01)

(58) Field of Classification Search
CPC .......... F16H 2025/204; F16H 25/2006; F16H 2025/2081
USPC ......... 74/89.32, 89.42, 89.52, 474.71, 424.72
See application file for complete search history.

(56) References Cited

U.S. PATENT DOCUMENTS

| | | | |
|---|---|---|---|
| 2,228,244 A | 1/1941 | Baker | |
| 2,348,611 A | 5/1944 | Davidson | |
| 3,359,792 A | 12/1967 | Lukens | |
| 3,656,358 A | 4/1972 | Kopp | |
| 3,713,932 A | 1/1973 | Butzow et al. | |
| 4,131,031 A | 12/1978 | Erikson et al. | |
| 4,210,033 A | 7/1980 | Erikson et al. | |
| 4,249,426 A | 2/1981 | Erikson et al. | |
| 4,274,294 A | 6/1981 | Siryj et al. | |
| 4,282,764 A | 8/1981 | Harris | |
| RE32,433 E | 6/1987 | Erikson et al. | |
| 4,954,032 A * | 9/1990 | Morales | 411/289 |

(Continued)

FOREIGN PATENT DOCUMENTS

| | | |
|---|---|---|
| GB | 2 408 301 A | 5/2005 |
| JP | 61228157 A | 10/1986 |

(Continued)

OTHER PUBLICATIONS

Haydon Kerk News; date last visited Jan. 13, 2012, but known to Applicant prior to filing of application; 1 page printed from internet; http://www.haydonkerk.com/News/tabid/231/novusact/viewarticle/Default.aspx?articleid=RGMUPZ00Xgo.

*Primary Examiner* — William Kelleher
*Assistant Examiner* — Zakaria Elahmadi
(74) *Attorney, Agent, or Firm* — Reinhart Boerner Van Deuren P.C.

(57) ABSTRACT

A inverted spline rail system is provided. The inverted spline rail system includes a drive motor that rotates a drive screw. The drive screw has a associated nut body. The nut body includes a attachment portion that a user can attach a device that requires linear motion control. Furthermore, the nut body is located inside of a cylindrical body that encases the drive screw. The nut body has guide teeth that mate with an internally splined guide rail of the cylindrical body that contains both the nut and the drive screw. The reciprocating nature of the guide teeth of the nut and the internally splined guide rail of the cylindrical body translate the rotational motion of the drive screw into linear motion of the nut body. The inverted spline rail system is protected from its operating environment by a seal.

10 Claims, 6 Drawing Sheets

(56) References Cited

U.S. PATENT DOCUMENTS

| | | | |
|---|---|---|---|
| 5,027,671 A | 7/1991 | Erikson et al. | |
| 5,303,606 A | 4/1994 | Kokinda | |
| 5,601,372 A | 2/1997 | Erikson et al. | |
| 5,637,940 A * | 6/1997 | Nagai et al. | 310/80 |
| 5,732,596 A | 3/1998 | Erikson et al. | |
| 5,913,940 A | 6/1999 | Erikson et al. | |
| 5,913,941 A | 6/1999 | Erikson et al. | |
| 5,937,702 A | 8/1999 | Erikson et al. | |
| 6,041,671 A * | 3/2000 | Erikson et al. | 74/441 |
| 6,099,166 A | 8/2000 | Erikson et al. | |
| 6,117,249 A | 9/2000 | Erikson et al. | |
| 6,131,478 A | 10/2000 | Erikson et al. | |
| 6,202,500 B1 | 3/2001 | Erikson et al. | |
| 6,240,798 B1 * | 6/2001 | Erikson et al. | 74/424.81 |
| 6,415,673 B1 | 7/2002 | Erikson et al. | |
| 6,422,101 B2 | 7/2002 | Erikson et al. | |
| 6,467,362 B2 * | 10/2002 | Erikson et al. | 74/89.36 |
| 6,880,417 B2 * | 4/2005 | Nagai et al. | 74/89.36 |
| 7,066,045 B2 * | 6/2006 | Krause | 74/424.78 |
| 7,219,570 B2 | 5/2007 | Erikson et al. | |
| 7,506,557 B2 | 3/2009 | Hosokai et al. | |
| 7,552,657 B2 * | 6/2009 | Erikson et al. | 74/89.42 |
| 7,891,265 B2 * | 2/2011 | Erikson et al. | 74/441 |
| 7,992,456 B2 | 8/2011 | Schroeder et al. | |
| 8,028,594 B2 * | 10/2011 | Schroeder | 74/89.42 |
| 8,561,491 B2 * | 10/2013 | Fukano et al. | 74/89.32 |
| 2004/0093971 A1 | 5/2004 | Fujibayashi | |
| 2005/0193844 A1 * | 9/2005 | Angue et al. | 74/89.32 |
| 2007/0295128 A1 | 12/2007 | Erikson et al. | |
| 2008/0119294 A1 | 5/2008 | Erikson et al. | |
| 2009/0049938 A1 * | 2/2009 | Teramachi et al. | 74/22 A |
| 2009/0249910 A1 | 10/2009 | Erikson et al. | |
| 2009/0314111 A1 * | 12/2009 | Schunke | 74/89.32 |
| 2011/0072927 A1 * | 3/2011 | Gilbas et al. | 74/424.76 |
| 2012/0146439 A1 * | 6/2012 | Gibas et al. | 310/83 |
| 2013/0160585 A1 * | 6/2013 | Schroeder et al. | 74/89.42 |

FOREIGN PATENT DOCUMENTS

| | | |
|---|---|---|
| JP | 2001-221313 A | 8/2001 |
| JP | 2001-280440 A | 10/2001 |
| JP | 2003-240098 A | 8/2003 |
| WO | WO 2006/106817 A1 | 10/2006 |

* cited by examiner

INVERTED SPLINE RAIL SYSTEM

FIELD OF THE INVENTION

This invention generally relates to linear motion rail systems, and more particularly relates to devices utilizing splines to transfer rotational motion into linear motion.

BACKGROUND OF THE INVENTION

Linear motion rail systems are used in many industries such as robotics, manufacturing, food processing, medical device industries, etc. Many of, these linear motion rail systems are composed of a motor actuated drive screw that mates with a nut. The nut has one or more threads that engage cooperating threads of the drive screw. Additionally, the nut mates with a guide rail. The guide rail prevents the nut from rotating when the motor actuates the drive screw. Because the nut is prevented from rotating with the drive screw the rotational motion of the drive screw is turned into linear motion of the nut. Thus, actuating the drive screw causes the nut to slide in a linear direction along the guide rail. An example of the current state of the art of linear motion rail systems is shown in U.S. Pat. No. 7,552,657.

As previously mentioned, linear motion rail systems are used in a variety of industrial applications. Many of these applications expose the rail system to various types of particulate and liquid matter. This matter will be able to collect on various surfaces of the linear motion rail system. Particularly, when the guide rail is an outwardly projecting splined guide rail, matter will gather on the outwardly projecting splines. Because the nut must slide along the outwardly projecting splines, any matter that gathers on the splines will become a hindrance to the linear motion of the nut.

Additionally, impact damage is potentially possible for the outwardly projecting splines. If the linear motion rail system is inadvertently impacted by some other device damage may be caused to the rail system, which could potentially hinder the linear motion rail system's ability to operate, or to operate with high precision.

Therefore, the linear motion rail system requires routine servicing at the cost of downtime for operation of the device and other attendant expenses related to maintenance of the device.

There exists, therefore, a need in the art for an improved guide rail system. The invention provides such an improved guide rail system. These and other advantages of the invention, as well as additional inventive features, will be apparent from the description of the invention provided herein.

BRIEF SUMMARY OF THE INVENTION

In one embodiment, the present invention is directed toward a splined rail system comprising a lead screw, an internally splined guide rail, a nut, and a seal. The lead screw rotates about a rotational axis. The internally splined guide rail defines an internal cavity in which the lead screw extends, and the guide rail includes a plurality of guide teeth extending longitudinally parallel to the rotational axis, being angularly spaced apart, and extending radially inward. Additionally, the nut is attached to the lead screw positioned within the internal cavity, the nut includes a plurality of guide teeth extending radially outward and being angularly spaced apart, the guide teeth mate with the guide teeth of the guide rail. Further, the guide rail defines a mouth and the nut includes a first portion extending radially through the mouth and external of the internally splined guide rail. A seal substantially seals the mouth of the guide rail with the first portion extending through the seal and external of the internal cavity.

In another embodiment, the splined rail system further comprises a drive motor. The drive motor is configured to rotate the lead screw about the rotational axis.

In another embodiment, the portion of the nut that radially extends through the mouth of the guide rail is configured to be attached to an external component for driving the external component parallel to the rotational axis.

In another embodiment, the nut includes a nut body that defines a screw receiving aperture that includes internal threading through which the lead screw extends, the lead screw having external threading engaging the internal threading of the nut body.

In yet another embodiment, the splined rail system further comprises a second drive motor. The second drive motor is operably coupled to the guide rail for rotationally driving the guide rail about the rotational axis.

In a further embodiment, the seal includes a pair of seal flaps extending towards one another, each flap having a distal end, the distal ends abutting one another to form a seal interface therebetween.

In another embodiment of the present invention, the pair of seal flaps include a seal head that is inserted in a head interface at the mouth of the guide rail, such that the seal prevents debris from entering the guide rail radially.

In another embodiment, the distal ends angularly abut the portion of the nut extending through the mouth.

In a further embodiment, the portion of the nut extending through the mouth includes seal separating wedges facing axially away from one another. The wedges assist in separating the distal ends of the seal flaps at the seal interface to permit passage of the nut along the guide rail.

In a further embodiment, the guide rail has a generally cured periphery.

In another embodiment the invention includes an anti-backlash nut that cooperates with a lead screw. The anti-backlash nut comprises a first nut body including a first internally threaded through hole defining a central axis and configured to mate with the lead screw. The anti-backlash nut also comprises a second nut body including a second internally threaded through hole configured to mate with the lead screw. The anti-backlash nut also comprises a biasing spring operably biasing the first nut body relative to the second nut body in opposed axial direction. Further, the anti-backlash nut also comprises an anti-rotation interface between the first nut body and the second nut body to prevent relative rotation therebetween.

In a further embodiment of the anti-backlash nut, the first nut body includes a first biasing surface facing axially outward and orthogonal to a central axis of the internally threaded through hole. And the second nut body includes a second biasing surface facing axially outward and orthogonal to a central axis of the internally threaded through hole and facing the first biasing surface.

In another embodiment of the anti-backlash nut, the first nut body includes a first anti-rotation surface radially offset from the central axis. The second nut body further includes a second anti-rotation surface radially offset from the central axis. The first anti-rotation surface radially engaging to prevent relative rotation between the first and second nut bodies about the central axis; wherein the first and second anti-rotation surfaces permit relative axial translation between the first and second nut bodies parallel to the central axis.

In a further embodiment of the anti-backlash nut, the first nut body and the second nut body have radially outward projecting splines forming an outer periphery thereof.

In another embodiment of the anti-backlash nut, the first and second surfaces are planar and parallel to the central axis.

In a further embodiment of the anti-backlash nut, the biasing spring provides a force biasing the first nut body away from the second nut body.

In another embodiment of the present invention, an anti-backlash nut comprises a body, a plurality of flexible fingers defining an inner periphery circumference having a first radial dimension axially extending from the body and connected to one another through the body. Further, the anti-backlash nut comprises a circumferential groove formed in a radially outer periphery of the plurality of fingers, the groove having a groove bottom having a second radial dimension greater than the first radial dimension. Further, the anti-backlash nut comprises a snap ring inserted in the circumferential groove applying a radially inward directed pressure on the flexible fingers, the snap ring having a radially inner periphery being smaller than the dimension of the bottom of the groove.

In further embodiment of the anti-backlash nut, the plurality of flexible fingers are internally threaded.

In another embodiment of the anti-backlash nut, the snap ring decreases the first radial dimension when inserted in the circumferential groove.

In yet another embodiment, the present invention is directed toward a splined rail system comprising a lead screw, a first drive motor, an internally splined guide rail, a second drive motor, and a nut. A first drive motor is configured to rotate the drive screw about a rotational axis. The internally splined guide rail defines an internal cavity in which the lead screw extends. The guide rail includes a plurality of guide teeth extending longitudinally parallel to the rotational axis, spaced apart, and extending radially inward. The second drive motor is operably coupled to the guide rail for rotationally driving the guide rail about the rotational axis. The nut is attached to the lead screw and includes a plurality of guide teeth extending radially outward, and angularly spaced apart such that the guide teeth mate with the guide teeth of the guide rail.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
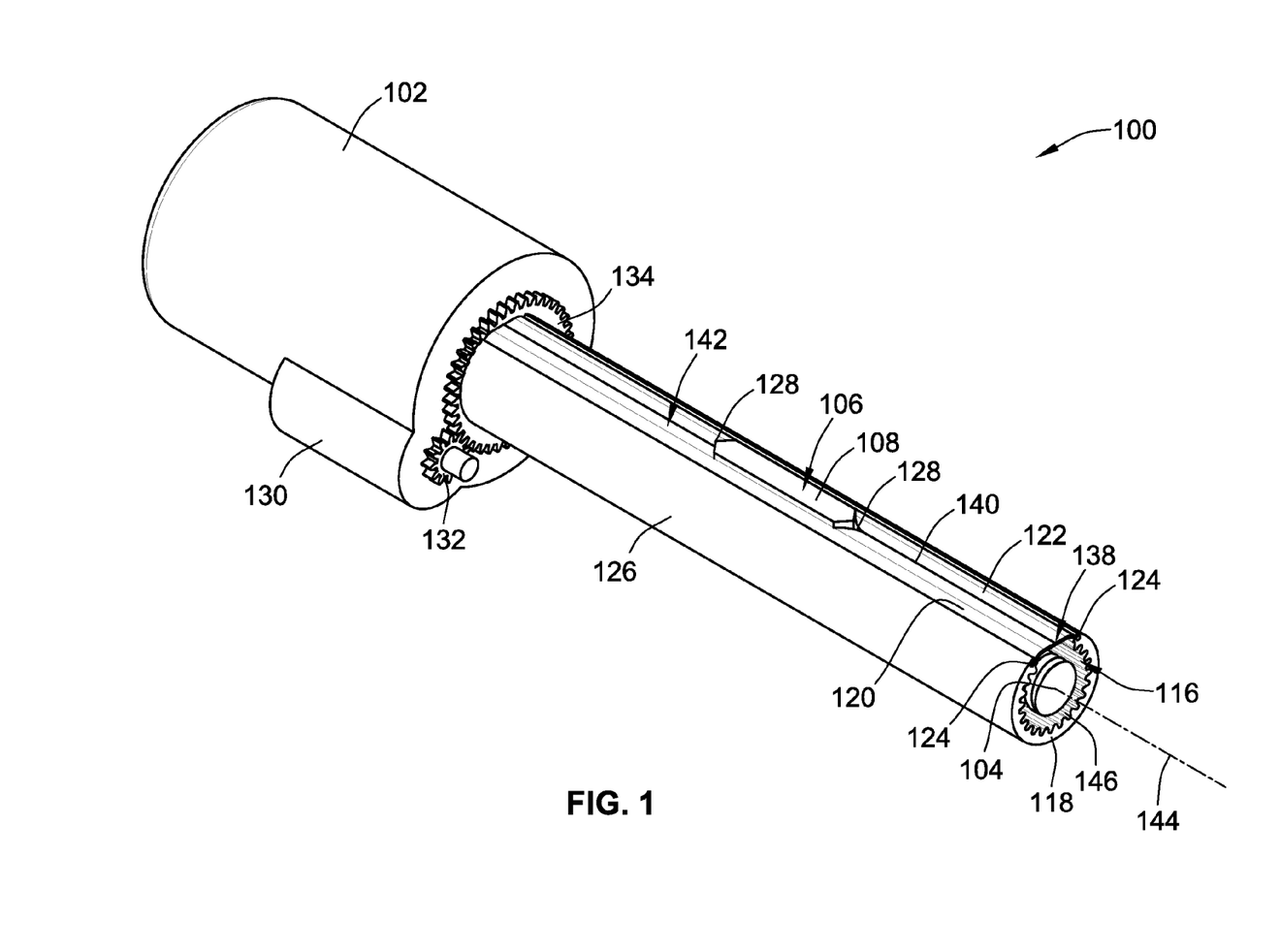
FIG. 1 is an exemplary embodiment of a inverted spline rail system in accordance with the teachings of the present invention.

FIG. 1 shows a guide rail system in the form of an inverted spline rail system 100 in accordance with a particular embodiment of the present invention. The inverted spline rail system 100 includes a drive motor 102 that rotates a lead screw 104, or by another name a drive screw 104. While in the particular embodiment of the invention shown in FIG. 1 a drive motor 102 rotates the drive screw 104, it is contemplated that other methods of rotating the drive screw 104 are possible, such as a crank or handle mechanism that attaches to the drive screw 104. The drive screw 104 interfaces with a nut 106 to create linear motion along a central or linear axis 144. The nut 106 includes a nut attachment section 108 to which devices such as medical devices or machining tools can be attached for corresponding linear motion parallel to axis 144.

The inverted spline rail system 100 further includes a cylinder body 126 having an internally splined guide rail 118. The inner periphery of the cylinder body 126 includes a plurality of teeth 146. The nut 106 has guide teeth 136 that mate with the internally splined guide rail 118 and particularly with the teeth 146.

The inverted spline rail system 100 can translate rotational motion of the drive screw 104 to linear motion of the nut 106. As the drive motor 102 rotates the drive screw, the internally splined guide rail 118 prevents the nut 106 from rotating. Because the nut 106 is not allowed to rotate, the rotational motion of the drive screw 104 is transferred into linear motion of the nut 106 along axis 144.

The nut 106 has a attachment section 108, which allows the system user to attach various devices to the inverted spline rail system 100. The attachment section 108 extends outside of the internal cavity 116 of the internally splined guide rail 118 through a mouth 138 of the cylinder body 126. This allows a device mounted to the attachment section 108 to move along with the nut 106.

In the embodiment of the invention shown in FIG. 1, the inverted spline rail system 100 includes a seal 142 formed by a first and a second seal flaps 120, 122, that operably seal with one another. The first and second flaps 120, 122 engage one another such that the first and second flaps 120, 122 form a seal interface at the mating distal ends 140 of each seal flap 120, 122, in the center of the mouth 138 of the cylinder body 126. The first and second seal flaps 120, 122 are held in the cylinder body 126 by an enlarged head portion 124 of each flap 120, 122. The head portions 124 are received in a corresponding head interface or groove in the cylinder body 126 that have a reduced width mouth through which the head portions 124 cannot laterally pass. Additionally, the first and second seal flaps 120, 122 are of such a length that they span the length of linear motion capable of the inverted spline rail system 100, and the first and second seal flaps 120, 122 are long enough and wide enough that they seal off the opening made in the cylinder body 126 (e.g. mouth 138), from the outside environment.

The seal 142, or at least the mating distal ends 140 of the first and second seal flaps 120, 122 are made from a flexible material such that they allow the attachment portion 108 of the nut 106 to protrude through the seal. Therefore the device attached to the attachment portion 108 of the nut 106 can move linearly, but the internal cavity 116 of the cylinder body 126 is protected from the outside environment. Furthermore, the attachment portion 108 includes wedges 128. The wedges 128 separate the seal flaps 120, 122 to allow the flexible material of seal 142 to wrap around the wedges 128 during motion of nut 106. Therefore, little to no particulate or liquid matter from the industrial application of the linear rail system 100 will be deposited in the internal cavity 116 of the internally splined guide rail 118, or any other structure contained in the internal cavity 116.

In the particular embodiment of the invention shown in FIG. 1, the inverted spline rail system 100 includes both the drive motor 102 and a second drive motor 130. The second drive motor allows the inverted spline rail system 100 to rotate a device attached to the attachment portion 108 of nut 106 in a circular path around the longitudinal center axis 144 of the inverted spline rail system 100.

The second drive motor 130 rotates the cylinder body 126 relative to drive motor 102 through the interaction of a pinion gear 132 and a spur gear 134. The second drive motor 130 rotates the pinion gear 132, which in turn rotates the spur gear 134, which is operably coupled to the cylinder body 126.

Furthermore, the drive screw 104 is connected to the drive motor 102 and is otherwise freestanding within the internal cavity 116. Because the drive screw 104 is only attached to the drive motor 102, the nut 106 is allowed to travel the full length of the drive screw 104 along axis 144.

Figure 2:
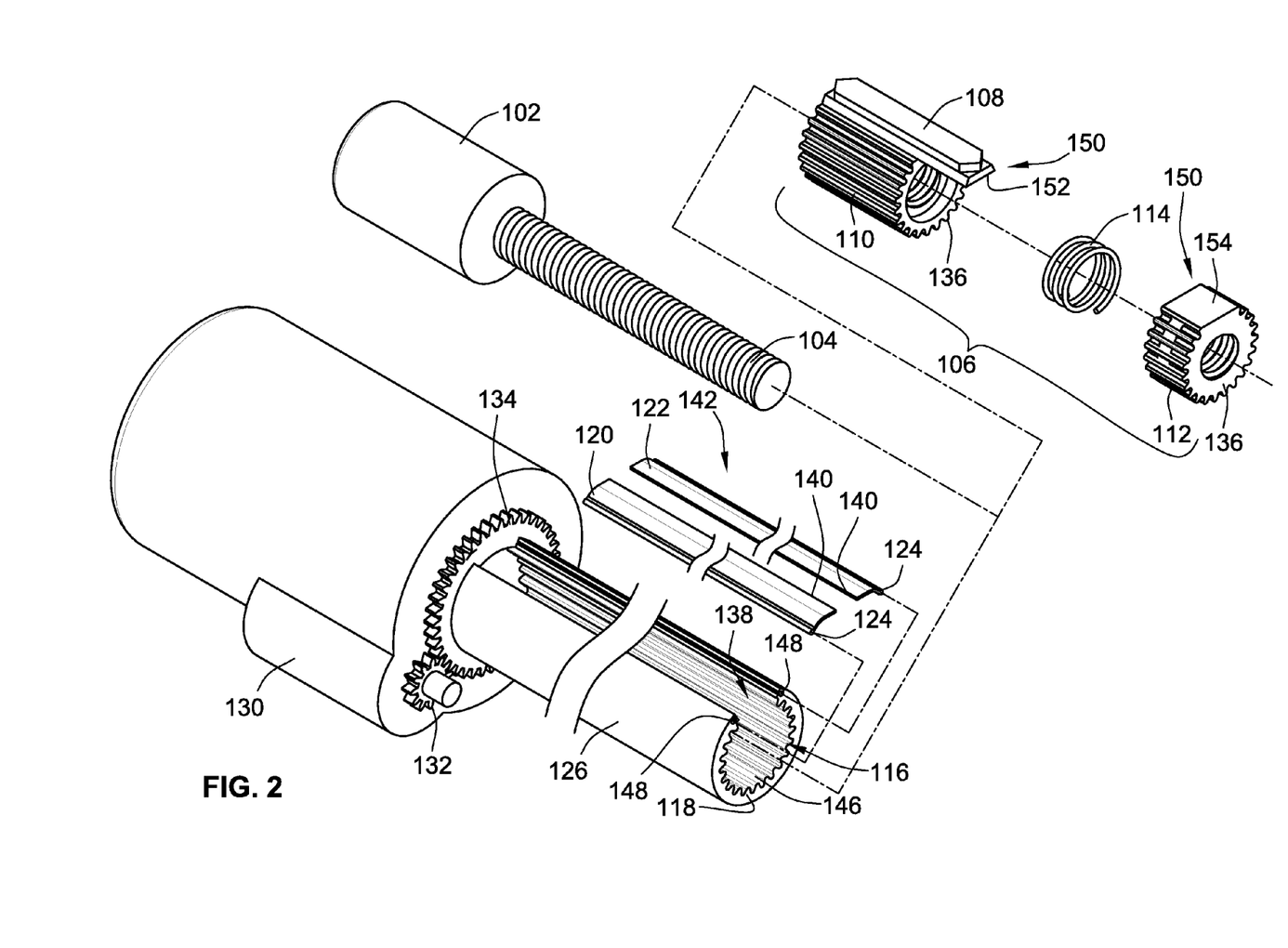
FIG. 2 is a exploded view of the inverted spline rail system, in accordance with the teachings of the present invention.
Figure 3:
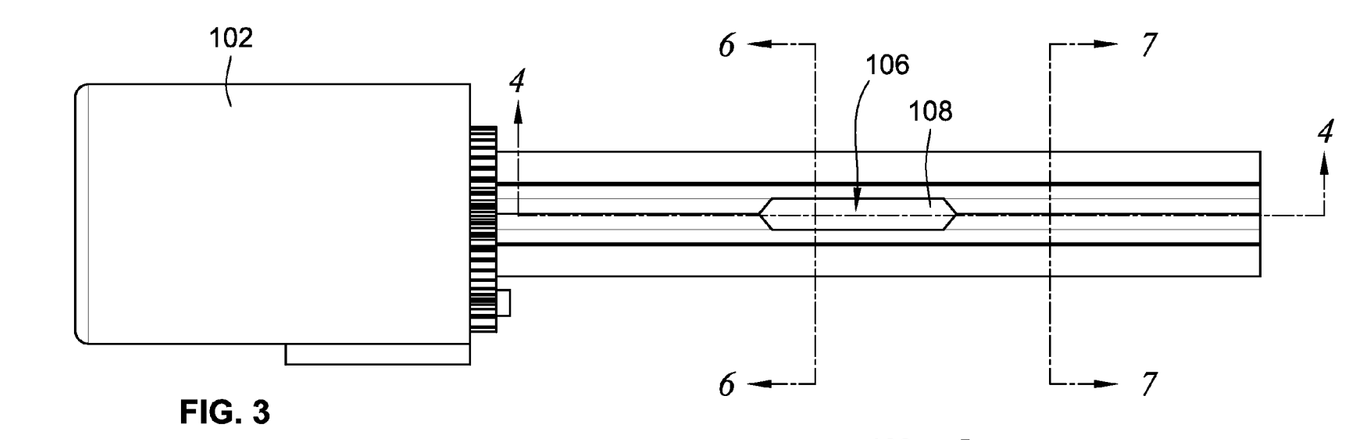
FIG. 3 is a top view of the inverted spline rail system, in accordance with the teachings of the present invention.

FIG. 2 illustrates an exploded view of the inverted spline rail system 100 of FIG. 1. Nut 106 is illustrated in greater detail. In the particular embodiment of the invention illustrated in FIG. 2, the nut 106 is an anti-backlash nut 106. The anti-backlash nut 106 includes a first nut body 110 and a second nut body 112 and a biasing spring 114. The first and second nut bodies 110, 112 are internally threaded to engage the drive screw 104. The exterior of the first and second nut bodies 110, 112 contain guide teeth 136 that engage and cooperate with the teeth 146 of the internally splined guide rail 118.

The biasing spring 114 of the anti-backlash nut 106 acts to eliminate backlash between the nut 106 and drive screw 104 experienced when the drive screw 104 changes rotational direction. As the inverted spline rail system 100 ages, the threads of the drive screw 104 and/or the inner threads of the anti-backlash nut 106 will wear. Therefore, some unwanted linear motion could potentially occur during system operation. This unwanted motion is protected against by the biasing spring 114. The biasing spring 114 provides a constant force between the first and the second nut bodies 110, 112 such that the first and second nut bodies 110, 112 continuously seat against the cooperating threads of the drive screw without any unwanted linear motion.

The anti-backlash nut 106 also includes a surface rotation prevention interface 150. Interface 150 includes a first radially outward rotation prevention surface 152 of the first nut body 110, and a second radially outward rotation prevention surface 154 of the second nut body 112. During operation of the inverted spline rail system 100, the first and the second nut bodies 110, 112 will be close in proximity. The first surface 152 will over lap with the second surface 154. This over lap creates the interface 150. The interface 150 prevents non-uniform rotation by forcing a common rotational angle for the first and the second nut bodies 110, 112.

FIG. 2 also illustrates the first and second seal flaps 120, 122 removed from the cylinder body 126. As was discussed in relation to FIG. 1, the first and second seal flaps 120, 122 connect to the cylinder body 126 at the head portions 124, which engage the grooves 148 that run the length of the cylinder body 126. The first and second seal bodies 120, 122 are flexible such that the attachment portion 108 of anti-backlash nut 106 can protrude through the mating distal ends when the first and second seal flaps 120, 122 are installed.

Figure 4:
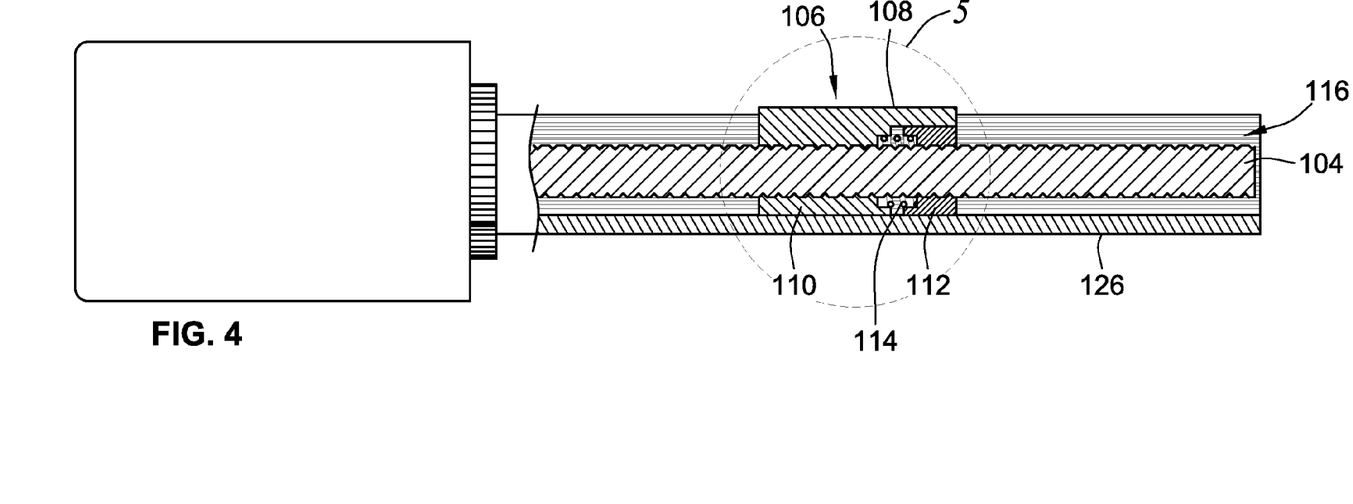
FIG. 4 is a lengthwise cross section of the linear drive system, in accordance with the teachings of the present invention.
Figure 5:
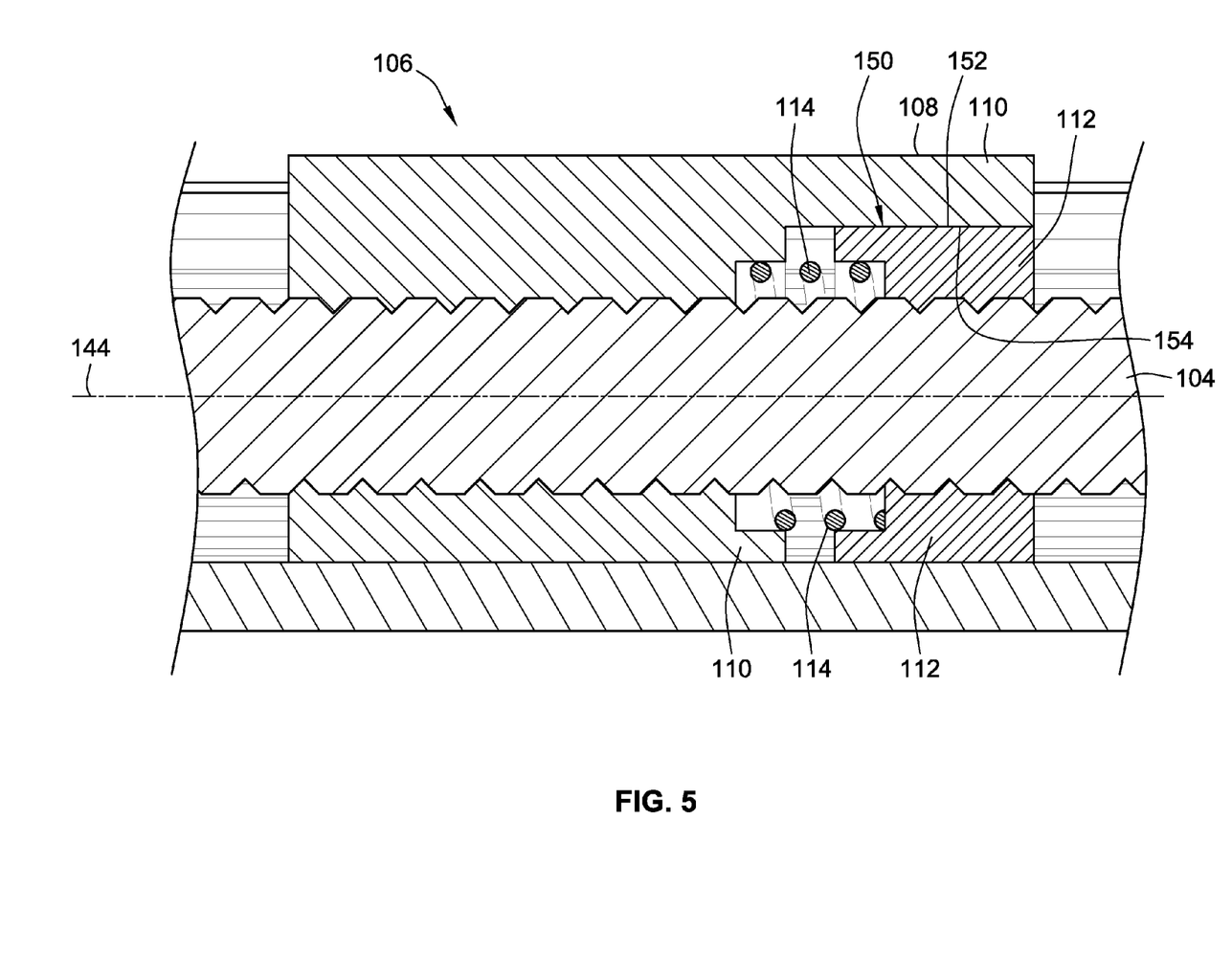
FIG. 5 is a close up of the cross section of FIG. 4, in accordance with the teachings of the present invention.

FIG. 4 is a cross-section of the cylinder body 126, the drive screw 104, and the nut 106. FIG. 5 shows how the bias spring 114 engages both the first and second nut bodies 110, 112 during operation of the inverted spline rail system 100 to bias the nut bodies 110, 112 axially away from one another.

Furthermore, FIG. 5 illustrates the operation of the surface rotation prevention interface 150. Interface 150 includes a first radially outward rotation prevention (or anti-rotation) surface 152 of the first nut body 110, and a second radially outward rotation prevention (or anti-rotation) surface 154 of the second nut body 112. As mentioned above, during operation the first and the second nut bodies 110, 112 are close in proximity such that the first surface 152 overlaps with the second surface 154. The mating of these two surfaces creates the interface 150. The interface 150 forces a common rotational angle for both the first and the second nut bodies 110, 112. The interface 150 permits relative axial translation between the first and the second nut bodies parallel to the linear axis 144.

Figure 6:
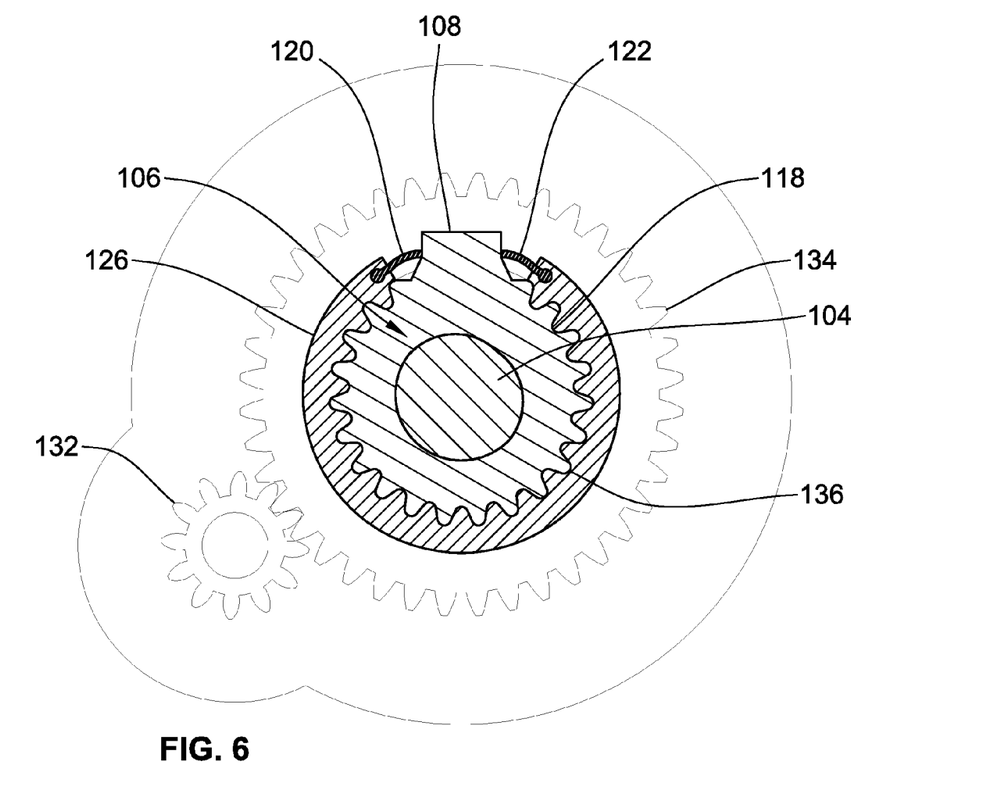
FIG. 6 is a frontal view cross section of the linear drive system facing toward the nut and the drive motor, in accordance with the teachings of the present invention.

FIG. 6 is a cross-sectional illustration of the nut 106 and the inverted spline rail system 100 looking axially down axis 144 the front lengthwise toward the drive motor 102. From this perspective, the engagement between the guide teeth 136 of nut 106 and the internally splined guide rail is illustrated. In this particular embodiment of the invention, this relationship between these two components exists through the entire length of the cylinder body 126. However, other embodiments where the spline structure is not uniform throughout the length of the cylinder body 126 are contemplated.

Additionally, FIG. 6 shows the attachment portion 108 of nut 106. The attachment portion 108 is shown protruding from the first and second seal flaps 120, 122.

Figure 7:
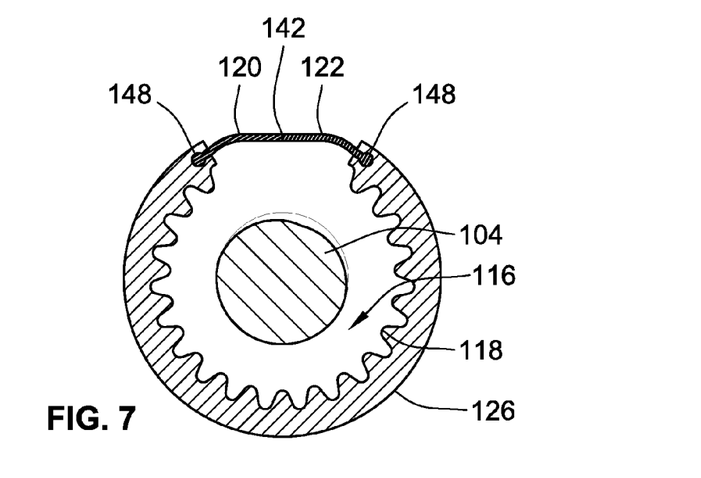
FIG. 7 is a frontal view of the linear drive system facing away from the nut and the drive motor, in accordance with the teachings of the present invention.

FIG. 7 shows another lengthwise cross-section looking away from the drive motor 102 and not including the nut 106. In FIG. 7, the first and second seal flaps 120, 122 are illustrated mating distal ends 140. Further, each of the first and second seal flaps 120, 122 connect to the cylinder body 126 at the head portion 124. From this perspective, it can be seen that the seal 142 forms a radially directed barrier protecting the internally splined rail 118 and the drive screw 104 from the broader environment in which the inverted spline rail system 100 is used. Therefore, debris is kept out of the internal cavity 116.

Figure 8:
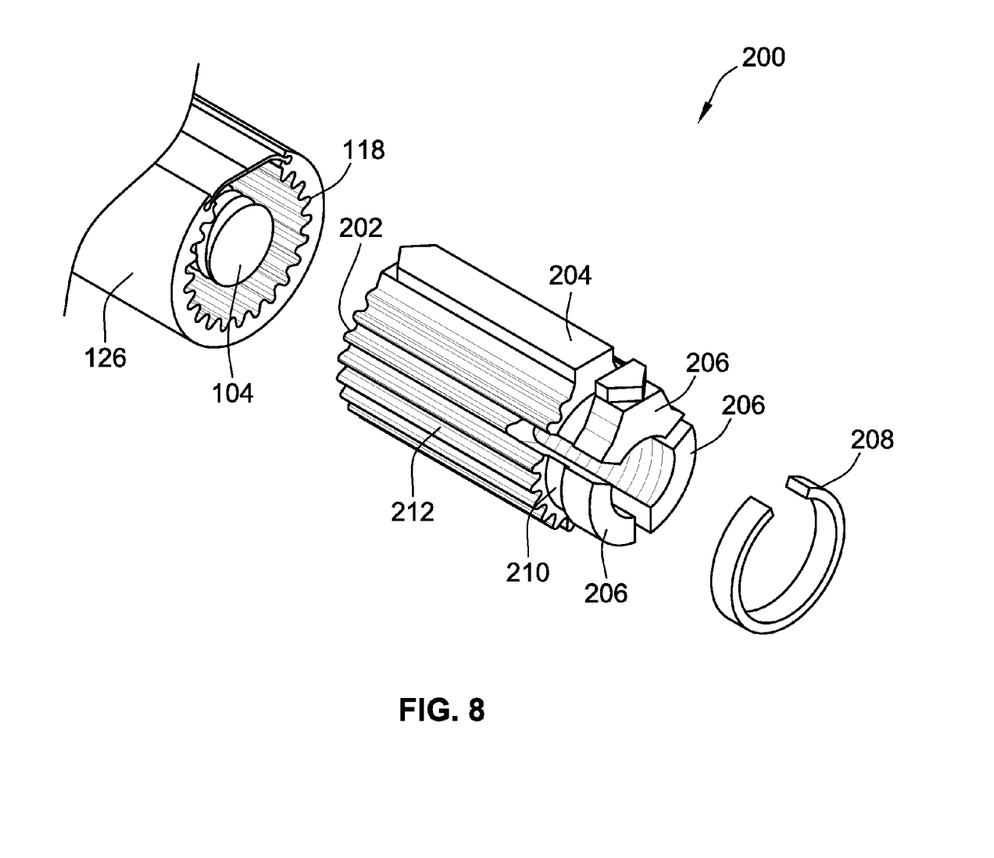
FIG. 8 is another embodiment of the nut, in accordance with the teachings of the present invention.

FIG. 8 shows another embodiment of an anti-backlash nut 200 in accordance with an embodiment of the present invention. The anti-backlash nut 200 of FIG. 8 includes splined teeth 202 that engage with the internally splined guide rail 118, and an attachment portion 204 that passes through seal 142, similar to the anti-backlash nut 106 (e.g. FIG. 2). However, the linear position of anti-backlash nut 200 is maintained, and backlash prevented, by the operation of a snap ring 208 and flexible fingers 206.

The nut body 212 includes flexible fingers 206 and a snap ring 208 received in groove 210 to cause fingers 206 to engage screw 104. The flexible finger 206 are biased radially against screw 104 by the snap ring 208, which fits in groove 210. The snap ring 208 applies a force between the flexible fingers 206 and the drive screw 104. This force helps to maintain the linear position of nut 200 when slop is present between the threads of the nut 200 and the drive screw 104 biased radially against screw 104.

The embodiment of the nut 200 shown in FIG. 8 shows three flexible fingers 206. The invention is not limited to three flexible fingers 206, and it is contemplated that more or less flexible fingers 206 could be present.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A splined rail system comprising:
   a lead screw for rotation about a rotational axis;
   an internally splined guide rail defining a mouth and an internal cavity in which the lead screw extends, the guide rail including a plurality of guide teeth extending longitudinally and generally parallel to the rotational axis, being angularly spaced apart, and extending radially inward;
   a nut attached to the lead screw positioned within the internal cavity, the nut including a plurality of guide teeth extending radially outward, and being angularly spaced apart, the guide teeth mating with the guide teeth of the guide rail;
      wherein the nut includes a first portion extending radially through the mouth and external of the internally splined guide rail;
   a seal substantially sealing the mouth of the guide rail, the first portion extending through the seal and being exposed externally of the internal cavity; and
   wherein the seal includes a pair of seal flaps extending towards one another, each flap having a distal end, the distal ends abutting one another to form a seal interface therebetween such that the seal prevents debris from entering the guide rail radially through the mouth.

2. The splined rail system of claim 1, further comprising a drive motor wherein the drive motor is configured to rotate the lead screw about the rotational axis.

3. The splined rail system of claim 1, wherein the first portion of the nut is configured to be attached to an external component for driving the external component parallel to the rotational axis.

4. The splined rail system of claim 1, wherein the nut includes a nut body that defines a screw receiving aperture that includes internal threading through which the lead screw extends, the lead screw having external threading engaging the internal threading of the nut body.

5. The splined rail system of claim 2, further comprising a second drive motor operably coupled to the guide rail for rotationally driving the guide rail about the rotational axis.

6. The splined rail system of claim 1, wherein each seal flap includes a seal head that is inserted in a head interface at the mouth of the guide rail.

7. The splined rail system of claim 1, wherein the distal ends angularly abut the portion of the nut extending through the mouth.

8. The splined rail system of claim 7, wherein the first portion of the nut includes seal separating wedges facing axially away from one another, the wedges assisting in separating the distal ends of the seal flaps at the seal interface to permit passage of the nut along the guide rail.

9. The splined rail system of claim 1, wherein the guide rail has a generally curved periphery.

10. The splined rail system of claim 1, wherein the mouth extends longitudinally and generally parallel to the rotational axis; and wherein the nut moves axially relative to the guide rail when the lead screw is rotated about the rotational axis, the first portion extending through the mouth as the nut moves axially along the guide rail.

* * * * *